(12) United States Patent
Perelman et al.

(10) Patent No.: US 10,145,753 B2
(45) Date of Patent: Dec. 4, 2018

(54) APPARATUS AND METHOD FOR DYNAMICALLY BALANCING ROTORS

(71) Applicant: Agilent Technologies, Inc., Santa Clara, CA (US)

(72) Inventors: Gershon Perelman, Cupertino, CA (US); Bartly Carlson, Scotts Valley, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 232 days.

(21) Appl. No.: 14/856,028

(22) Filed: Sep. 16, 2015

(65) Prior Publication Data

US 2016/0084727 A1    Mar. 24, 2016

Related U.S. Application Data

(60) Provisional application No. 62/054,261, filed on Sep. 23, 2014.

(51) Int. Cl.
| | |
|---|---|
| *G01M 1/34* | (2006.01) |
| *G01M 1/16* | (2006.01) |
| *G01M 1/22* | (2006.01) |

(52) U.S. Cl.
CPC ............... *G01M 1/16* (2013.01); *G01M 1/22* (2013.01); *G01M 1/34* (2013.01)

(58) Field of Classification Search
CPC ............ G01M 1/22; G01M 1/16; G01M 1/34; G01M 1/32; G01M 1/36
See application file for complete search history.

(56) References Cited

U.S. PATENT DOCUMENTS

| | | | | |
|---|---|---|---|---|
| 3,499,136 | A | * | 3/1970 | Nunnikhoven ......... G01M 1/34 219/121.11 |
| 3,663,795 | A | * | 5/1972 | Myer ...................... G01M 1/34 219/121.68 |
| 3,755,646 | A | * | 8/1973 | Muller .................... G01M 1/22 219/121.19 |
| 3,795,784 | A | * | 3/1974 | Moll ..................... G01C 25/005 219/121.62 |
| 3,909,584 | A | * | 9/1975 | Brienza .............. B23K 26/0823 219/121.6 |

(Continued)

FOREIGN PATENT DOCUMENTS

| | | | |
|---|---|---|---|
| EP | 0969274 A2 | | 1/2000 |
| GB | 1178337 | * | 1/1970 |
| GB | 1268482 | * | 3/1972 |

OTHER PUBLICATIONS

European Search Report dated Feb. 17, 2016 for related European Application No. 15186108.5.

(Continued)

*Primary Examiner* — Helen Kwok (57) ABSTRACT

A rotor is statically or dynamically balanced by driving the rotor to rotate at a desired speed, measuring an imbalance in the rotor, calculating an adjustment to be made in a mass distribution of the rotor based on the measured imbalance, and adjusting the mass distribution to reduce the imbalance. Mass adjustment is done by operating a laser to ablate material from the rotor according to operating parameters based on the adjustment calculated. The foregoing is done while the rotor is rotating.

20 Claims, 2 Drawing Sheets

(56) References Cited

U.S. PATENT DOCUMENTS

| | | | | |
|---|---|---|---|---|
| 4,028,524 A * | 6/1977 | Moll | | B23K 26/0823 |
| | | | | 219/121.69 |
| 4,037,076 A * | 7/1977 | Blackaby | | B23K 26/0823 |
| | | | | 219/121.61 |
| 4,060,707 A * | 11/1977 | Olsson | | F01D 5/027 |
| | | | | 219/121.62 |
| 4,096,988 A * | 6/1978 | Scuricini | | B04B 9/146 |
| | | | | 219/121.68 |
| 4,258,246 A * | 3/1981 | Karube | | G01M 1/34 |
| | | | | 219/121.67 |
| 4,495,811 A * | 1/1985 | Muller | | G01M 1/04 |
| | | | | 73/462 |
| 4,507,964 A * | 4/1985 | Borner | | G01M 1/225 |
| | | | | 73/462 |
| 4,543,463 A * | 9/1985 | Scuricini | | B04B 9/146 |
| | | | | 219/121.68 |
| 4,741,211 A * | 5/1988 | Borner | | G01M 1/28 |
| | | | | 73/462 |
| 4,773,019 A * | 9/1988 | Martin | | G01M 1/34 |
| | | | | 219/121.68 |
| 5,084,643 A * | 1/1992 | Chen | | G01M 1/20 |
| | | | | 310/90.5 |
| 5,267,140 A * | 11/1993 | Ibe | | G01M 1/32 |
| | | | | 118/669 |
| 5,627,762 A * | 5/1997 | Cameron | | G01M 1/22 |
| | | | | 700/279 |
| 6,303,896 B1 * | 10/2001 | Kopp | | F16K 31/52 |
| | | | | 219/121.6 |
| 7,658,108 B2 * | 2/2010 | Douglas | | G01M 1/14 |
| | | | | 73/459 |
| 2002/0017094 A1 * | 2/2002 | Landolt | | D01H 4/10 |
| | | | | 57/129 |
| 2010/0080705 A1 * | 4/2010 | Pronovost | | F01D 5/027 |
| | | | | 416/144 |
| 2013/0334184 A1 * | 12/2013 | Liu | | B23K 26/36 |
| | | | | 219/121.81 |

OTHER PUBLICATIONS

Randall L. Fox, Dynamic Balancing, Proceedings of the Ninth Turbomachinery Symposium (1980).

Dr. Rajiv Tiwari "Dynamic balancing of Rotors" under AICTE Sponsored QIP Short Term Course on Theory and Practice of Rotor Dynamics, available as early as Dec. 15, 2008.

Everett, Louis J. "Two-Plane Balancing of a Rotor System Without Phase Response Measurements." Journal of Vibration Acoustics Stress and Reliability in Design J. Vib. Acoust. 109.2 (1987): 162. Web.

John Vaughan, Static and Dynamic Balancing Second Edition, Bruell & Kjaer, www.bksv.com/doc/17-227.pdf (1978).

Macdara MacCamhaoil, Static and Dynamic Balancing of Rigid Rotors, Bruell & Kjaer, www.bksv.com/doc/Bo0276.pdf (1989).

Yu, John J. "Relationship of Influence Coefficients Between Static-Couple and Multiplane Methods on Two-Plane Balancing." J. Eng. Gas Turbines Power Journal of Engineering for Gas Turbines and Power 131.1 (2009): 012508. Web.

* cited by examiner

APPARATUS AND METHOD FOR DYNAMICALLY BALANCING ROTORS

RELATED APPLICATIONS

This application claims priority of U.S. Provisional Application Ser. No. 62/054,261, filed on Sep. 23, 2014, titled APPARATUS AND METHOD FOR DYNAMICALLY BALANCING ROTORS, which application is incorporated by reference herein in its entirety.

TECHNICAL FIELD

The present invention relates to the dynamic balancing of rotors, including balancing rotors while such rotors are rotating and, if desired, while such rotors are installed in their normal operating environments, and further relates to balancing rotors utilizing laser ablation.

BACKGROUND

The operation of various types of mechanisms, machines, apparatuses, devices, and the like entails the rotation of a component (e.g., a rotor) about an axis of rotation such as the axis of a shaft driven by a motor. The rotation of any rotor and shaft about an axis is attended by some amount of imbalance in the forces and inertia resulting from the rotation, due to the imperfect distribution of mass of the rotor and shaft about the axis (including as a result of inhomogeneity in the material), tolerances or imperfections in the fabrication of the rotor or shaft and/or in coupling between the rotor and the shaft, and the imperfect stiffness of the shaft. Imbalance in the rotating system occurs when the center of mass (CM) and the principal axis of inertia of the system do not coincide with the axis of rotation. Imbalance may be quantified as mass time radius, i.e., the radial distance of the center of mass from the axis of rotation. Imbalance can cause unwanted vibrations, noise, stresses on the shaft and rotating elements, and wear on the bearings.

A balancing technique may be performed to correct for (reduce) the imbalance in a rotating system. The purpose of balancing is to shift the center of mass of the rotating system as close as possible to the axis of rotation, and to bring the principal axis of inertia as close as possible into coincidence (in line) with the axis of rotation. The center of mass can be shifted by performing a single-plane (or static) balancing of the rotor. Such a solution, however, is not enough to fully balance the rotating system as there will still be a moment created by the tilt in the principal axis of inertia. To reduce this tilt is it necessary to modify/shift the imbalance at two "balancing" planes, according to a two-plane (or dynamic) balancing technique. When this is performed the proper shift of the center of mass will also be achieved. The two balancing planes may be arbitrarily selected/located and need not be the same as the planes in which bearings supporting the shaft are located.

Many techniques and instruments for balancing a rotor in a rotation system are known, including single-plane balancing, multi-plane balancing, soft bearing instruments, stiff bearing instruments, resonance frequency instruments, time domain data acquisition, frequency domain data acquisition, etc., as appreciated by persons skilled in the art. Common to all known techniques is the need to adjust one or more masses on the rotor to provide the required shift of the center of mass and principal axis of inertia to bring them as close as possible to the axis of rotation. To achieve these adjustments in conventional techniques, it is necessary to stop the rotor (thus ceasing operation of the associated system), perform the adjustment by adding, removing, or moving masses, spin the rotor back up to an angular speed (which often is a reduced speed in comparison to the rotor's normal operating speed), re-test the imbalance, and repeat the process one or more times as needed. For large and very fast rotating systems, the time required to stop the rotation and subsequently attain the required rotational speed can be significant, for example on the order of many minutes or even hours. In many cases due to the fact that the rotor is tested in a separate enclosure than its actual stator, the rotational speed will be significantly lower than the nominal operating speed. Clearly this down time is disadvantageous, and is exacerbated when the balancing process must be repeated in an iterative manner, potentially requiring multiple spin/stop cycles to achieve an acceptable level of correction/adjustment in the imbalance.

Therefore, there is a need for providing improved solutions to balancing rotating components.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for dynamically balancing a rotor includes: rotating the rotor about an axis; measuring an imbalance in the rotor; calculating an adjustment to be made to a mass distribution of the rotor based on the measured imbalance; and adjusting the mass distribution to reduce the imbalance, by operating a laser to ablate material from the rotor according to operating parameters based on the adjustment calculated, wherein measuring, calculating, and adjusting are performed while the rotor is rotating.

According to another embodiment, an apparatus for dynamically balancing a rotor includes: an accelerometer configured for measuring an imbalance in the rotor while the rotor is rotating by measuring radial acceleration at the mounting location, and configured for outputting a measurement signal indicative of measured radial acceleration; a laser configured for ablating material from the rotor while the rotor is rotating; and a computing device configured for: receiving the measurement signal from the accelerometer; calculating an adjustment to be made to a mass distribution of the rotor based on the measured signal; and adjusting the mass distribution to reduce the imbalance, by controlling the laser to ablate material from the rotor while the rotor is rotating, according to operating parameters based on the adjustment calculated.

In some embodiments, the apparatus is portable.

In some embodiments, the apparatus is part of a machine configured for rotating the rotor.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not

DETAILED DESCRIPTION

Figure 1:
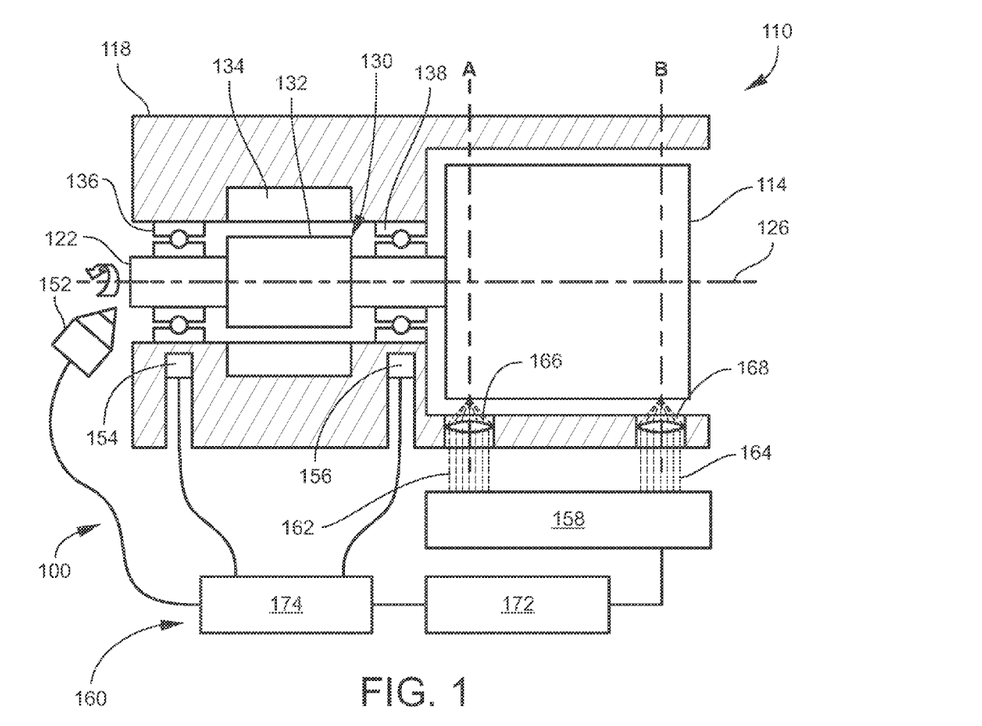
FIG. 1 is a schematic cross-sectional view of an example of a rotor balancing apparatus according to some embodiments, and an example of a machine that includes a rotor to be balanced by the rotor balancing apparatus.

FIG. 1 is a schematic cross-sectional view of an example of a rotor balancing apparatus 100 according to some embodiments, and an example of a machine 110 that includes a main rotor 114 to be balanced by the rotor balancing apparatus 100.

The main rotor 114 of the machine 110 rotates relative to a main stator 118, which generally may be any stationary structure. Depending on the type of machine 110, the main stator 118 may provide a specific function. For example, the main stator 118 may include features enabling it to cooperate with the main rotor 114 in moving a fluid. Alternatively, the main stator 118 may simply serve as a housing or enclosure for the main rotor 114 and other internal components of the machine 110. The main rotor 114 is securely coupled (or attached) to a shaft 122 and thus is rotatable with the shaft 112 about an axis 126. The shaft 112 in turn is coupled to a motor 130. Generally, the motor 130 may have any configuration for transferring energy to the shaft 122 so as to drive the shaft 122 (and consequently the rotor 114) to rotate about the axis 126. In the illustrated example, the motor 130 includes a motor rotor 132 coupled directly to the shaft 122 and a motor stator 134 surrounding the motor rotor 132. The configuration of the motor stator 134 depends on the type of motor 130 provided. For example, the motor stator 134 may be a magnet or electromagnet.

The shaft 122 is supported for rotation about the axis 126 (in other words, the shaft 122 is "rotatably" supported) by a plurality of bearings. In the illustrated example, the bearings include one or more first bearings 136 positioned on one axial side of the motor rotor 132, and one or more second bearings 138 positioned on the opposite axial side of the motor rotor 132. In the radial direction (orthogonal to the axis 126), the first bearings 136 and second bearings 138 are typically positioned between the shaft 122 and a stationary surface surrounding the shaft 122, such as may be part of the main stator 118. The first bearings 136 and second bearings 138 may be securely attached to the main stator 118 and in rolling contact with the shaft 122. As evident from the foregoing description, the main rotor 114 is mechanically referenced to the first bearings 136 and second bearings 138, and thus is rotatably supported by the first bearings 136 and second bearings 138. In the illustrated example, the main rotor 114 is positioned in a cantilevered relation to the shaft 122 and the first bearings 136 and second bearings 138. In other embodiments, the shaft 122 may be extended through the main rotor 114 and one or more additional bearings (not shown) may be provided on the side of the main rotor 114 opposite to the motor 130.

It will be understood that the machine 110 shown in FIG. 1 has been described above in a highly generalized manner, as no limitations are placed on the particular type of machine to which the present subject matter applies. By way of example, a "machine" may be defined generally as a mechanism or collection of mechanisms that transmits force from a source of power or a resistance to be overcome. See Mabie & Reinholtz, Mechanisms and Dynamics of Machinery, 4$^{th}$ ed., John Wiley & Sons, 1987, p. 5. Further, for purposes of the present disclosure, a machine includes at least one rotor (e.g., the main rotor 114 in FIG. 1) that may require dynamic balancing at the beginning of its service life in the machine, and possibly at one or more times during its service life. Generally, such a rotor will be attached to a shaft powered by a motor and rotatably supported by bearings. In the broad aspects of the subject matter disclosed herein, the foregoing components need not be limited to any particular configuration or design, and various configurations of such components and their operating principles are known to persons skilled in the art.

Moreover, the machine 110 shown in FIG. 1 generally may have any configuration (and arrangement of components) suitable for doing a desired type of work that entails rotating the main rotor 114 at a prescribed operating speed or range of operating speeds. The operating speed (or range) may be a "normal" operating speed or range (or "service" speed or range) of the main rotor 114, i.e., the speed at which the main rotor 114 is contemplated to rotate during the normal and intended operation of the machine 114. The balancing techniques disclosed herein may be implemented while the main rotor 114 is rotating at its normal operating speed. More generally, however, the balancing techniques disclosed herein may be implemented while the main rotor 114 is rotating at any desired speed, including speeds lower than or higher than the normal operating speed. For example, balancing the main rotor 114 while it is rotating at a higher than normal operating speed may be considered advantageous, in that it may result in an even lower level of imbalance in the main rotor 114 when the main rotor 114 is thereafter operated at the normal operating speed (i.e., a lower speed in comparison to the speed at which balancing was performed).

The rotor balancing apparatus 100 is configured for dynamically or statically balancing a rotor such as the main rotor 114 shown in FIG. 1. In some embodiments, the main rotor 114 is a component integral to the intended operation of the machine 110. In such embodiments, the main rotor 114 may be removable from the machine 110 and may be a replaceable component, but the intended and normal use of the main rotor 114 occurs when the main rotor 114 is installed in the machine 110. Accordingly, in this case the machine 110 itself is not a rotor balancing apparatus but instead is a machine that includes a rotor that may be dynamically balanced through the use of an appropriate rotor balancing apparatus, an example of which is described below. Generally, the machine 110 may be any type of machine that utilizes a rotor to perform work such as moving a linkage or cam, transferring force and/or torque from one linkage to another, moving fluid (gas and/or liquid) to transport the fluid, provide propulsion, or generate, convert, or store energy. As a few examples, the machine 110 may be or include a pump, turbine, propeller, impeller, gear, drum, flywheel, engine, etc. A pump in some embodiments may be a vacuum pump for maintaining a chamber at a desired vacuum level such as, for example, a turbomolecular pump.

In some embodiments, the rotor balancing apparatus 100 is portable. Thus, the rotor balancing apparatus 100 may be moved (transported) from one machine to another machine, and from one site containing one or more machines to another site containing one or more machines, so as to be able to perform dynamic balancing of the different rotors of different machines operating "in the field." As described below, certain components of the rotor balancing apparatus 100 may be mounted to, or placed in operative alignment with, the machine 110. The machine 110 may or may not be pre-configured to facilitate such mounting or alignment. Generally, it is contemplated that the rotor balancing apparatus 100 may be successfully implemented whether or not the machine 110 is so pre-configured.

In other embodiments the machine 110, or at least components of the machine 110 utilized for rotatably supporting the main rotor 114 and driving its rotation (e.g., shaft 122, bearings 136 and 138, motor 130), may be part of the rotor balancing apparatus 100. In this case, the main rotor 114 may be removed from the machine in which it normally operates, installed at the rotor balancing apparatus 100, driven to rotate at a desired speed, and balanced as described below. Similarly, the rotor balancing apparatus 100 or components thereof described below may be provided as add-on equipment to an existing balancing machine, thereby providing the existing balancing machine with the capability of balancing a rotor while the rotor is rotating, and providing the existing balancing machine with other advantages described herein.

In the embodiment illustrated in FIG. 1, the rotor balancing apparatus 100 includes a once-per-revolution pulse generator 152, one or more accelerometers such as a first accelerometer 154 and a second accelerometer 156, a laser ablation system (laser) 158, and a computing device 160.

The pulse generator 152 may have any configuration suitable for generating an electrical pulse signal (pulse) once per every revolution of the shaft 122. As appreciated by persons skilled in the art, the pulse generator 152 may be a magnetic or optical device such as, for example, a shaft encoder. The pulse generator 152 may be mounted to a surface near the shaft 122, or otherwise operatively aligned with the shaft 122 so as to be able to accurately sense the rotation of the shaft 122 and repeatedly output the same pulse shape once every revolution of the shaft 122. In the present context, "operatively aligned" means that the pulse generator 152 is positioned relative to the shaft 122 as needed for enabling the pulse generator 152 to perform its pulse generating function. Depending on the type of pulse generator 152 provided, a hash mark may need to be applied to the shaft 122 to a serve as a point of interrogation by the pulse generator 152. The output of the pulse generator 152 is transmitted to the computing device 160 via a suitable wired or wireless communication link, as schematically represented by a line in FIG. 1. The repeating pulse signal may be utilized to normalize the imbalance measurement signals outputted by the first accelerometer 154 and second accelerometer 156 (described below). In some embodiments, the pulse generator 152 may not be utilized, in which case the computing device 160 may be configured to carry out the signal processing and calculations needed for dynamic balancing (described below) without the simplification provided by normalizing the imbalance measurement signals.

The first accelerometer 154 and second accelerometer 156 are utilized to measure the imbalance (mass times radius) in the main rotor 114 by measuring radial acceleration at two different points along the axis 126 of rotation (i.e., at two different "measurement" planes orthogonal to the axis 126 of rotation). That is, the first accelerometer 154 and second accelerometer 156 measure the dynamic response to the reaction forces imparted by the unbalanced main rotor 114 per Newton's second law, F=ma. In the illustrated embodiment, the first accelerometer 154 and second accelerometer 156 are mounted to the main stator 118 at positions coplanar with the first bearings 136 and second bearings 138, respectively (i.e., the bearing planes are selected as the measurement planes). In this case, radial accelerations measured by the first accelerometer 154 and second accelerometer 156 are due to motions induced by the forces produced by the unbalanced main rotor 114, which are transferred to these positions (the mounting locations of the first accelerometer 154 and second accelerometer 156) through the shaft 122 and the first bearings 136 and second bearings 138. In the illustrated embodiment, the main stator 118 has recesses in which the first accelerometer 154 and second accelerometer 156 may be mounted proximate to the first bearings 136 and second bearings 138. However, the first accelerometer 154 and second accelerometer 156 may be mounted to any other locations coplanar with the first bearings 136 and second bearings 138. Alternatively, the first accelerometer 154 and second accelerometer 156 may be mounted directly to the first bearings 136 and second bearings 138 if permitted by the configuration of the machine 110. As a further alternative, the first accelerometer 154 and second accelerometer 156 may be mounted at other locations not coplanar with the first bearings 136 and second bearings 138, so long as the first accelerometer 154 and second accelerometer 156 are able to accurately measure radial acceleration at two different points along the axis 126 of rotation that correspond to measurements of the rotor imbalance. The output measurement signals of the first accelerometer 154 and second accelerometer 156 are transmitted to the computing device 160 via a suitable wired or wireless communication links, as schematically represented by lines in FIG. 1.

The provision of both the first accelerometer 154 and the second accelerometer 156 enables imbalance measurements to be performed at the two different measurement planes simultaneously. However, as a further alternative only one accelerometer may be provided, in which case the imbalance measurements would be performed at the two different planes sequentially. That is, the single accelerometer initially would be mounted to a first mounting location (first measurement plane) to make a first imbalance measurement. Then, the accelerometer would be mounted to a second mounting location (second measurement plane) to make a second imbalance measurement.

The laser 158 may be any laser having an output power suitable for ablating (removing) material of the type from which the main rotor 114 is constructed, e.g., various types of metals, metal alloys, composites, polymers, ceramics or any other material used on rotating equipment. Also, in embodiments disclosed herein, the laser 158 is operated to ablate material while the main rotor 114 is rotating at its normal operating speed. Thus, the laser 158 is configured for fast pulsed operation, high repetition frequency, and high firing locking resolution suitable for precision balancing of the main rotor 114 by material ablation while the main rotor 114 is rotating. The laser 158 is configured for generating a first laser beam 162 and a second laser beam 164. The first laser beam 162 and second laser beam 164 are optically aligned with respective balancing planes A and B (or first plane and second plane, respectively) that pass through the main rotor 114 orthogonally to the axis 126 of rotation. The balancing planes A and B may be spaced at an arbitrarily selected distance from each other along the axis 114 or rotation, and at arbitrarily selected axial locations along the axis 114 of rotation. In some embodiments, the laser 158 may include first optics 166 and second optics 168 (e.g., lenses) in the light path between the beam outputs and the main rotor 114 to concentrate the respective laser beams 162 and 164. Alternatively, depending on the type of laser 158 provided, the as-generated first laser beam 162 and second laser beam 164 may be sufficiently collimated and concentrated as not to require external optics 166 and 168. The operating parameters of the laser 158 (e.g., timing and duration of pulses) may be controlled by the computing device 160 via control signals transmitted over suitable wired or wireless communication links, as schematically represented by a line in FIG. 1. As described below, the laser 158 is utilized to create trial imbalances in the main rotor 114, optionally remove trial imbalances in the main rotor 114, and adjust the mass distribution of the main rotor 114 so as to reduce or eliminate the imbalance of the main rotor 114.

The laser 158 may be located at any position relative to the main rotor 114 at which two light paths for the respective first laser beam 162 and second laser beam 164 can be established from the laser 158 to the main rotor 114. In the illustrated embodiment, the main stator 118 has bores through its structure that provide access to the main rotor 114 from outside the main stator 118. Thus in the illustrated embodiment, the laser 158 is positioned such that first laser beam 162 and second laser beam 164 are optically aligned with these respective bores, thereby defining the two light paths to the main rotor 114 (and likewise defining the position of the two balancing planes A and B). By this configuration, the laser beams 162 and 164 remove material from the perimeter of the main rotor 114. Also in the illustrated embodiment, by way of example, the optional external optics 166 and 168 have been positioned in the two bores. Alternatively, the laser 158 may be positioned, or the light paths controlled (via suitable optics such as mirrors), such that the laser beams 162 and 164 are directed horizontally to one or both axial ends of the main rotor 112, whereby material is removed from surfaces of the main rotor 112 lying in the balancing planes A and B instead of from the perimeter of the main rotor 114 at the balancing planes A and B.

The material to be ablated may be an integral part of a functional feature of the main rotor 114, for example a set of rotor blades. Alternatively, the main rotor 114 may include additional material (sacrificial material) provided specifically (and possibly solely) for the purpose of providing a target of ablation. For example, the main rotor 114 may include solid disks of material (not shown) located at designated balancing planes A and B, such as on both sides of a functional feature such as a set of rotor blades.

The computing device 160 is schematically shown as including a main controller (or control module) 172 and a dynamic signal analyzer (DSA, or dynamic signal analyzing module) 174. The DSA 174 may be configured to receive the time domain signals from the pulse generator 152 and the accelerometers 154 and 156, convert the time domain signals into frequency domain signals, and normalize the accelerometer signals by the once-per-revolution pulse signal. Once the signals have been so acquired and processed, the DSA 174 or the main controller 172 may be configured to perform a series of calculations and produce the required information for the proper adjustment of imbalance (mass times radius), and phase or relative angle where the adjustment should be performed. The DSA 174 or the main controller 172 may be configured to utilize this information to transmit control signals to the laser 158 that control the operating parameters of the laser 158 (e.g., timing/phase and duration of laser beam application) as needed for effecting the proper adjustments to the mass distribution of the main rotor 114. Generally for the foregoing purposes, the computing device 160 may include hardware (microprocessor, memory, etc.) components, or both hardware and software components, as appreciated by persons skilled in the art. In FIG. 1 the computing device 160 may also schematically represent input and output devices that provide a user interface, such as keypads, keyboard, joystick or mouse controller for user input, a display device for presenting data and information to the user, etc.

An example of a method for dynamically balancing the main rotor 114 will now be described. First, the rotor balancing apparatus 100 is prepared for operation by interfacing the rotor balancing apparatus 100 with the machine 110. In the present example, this is done by mounting or positioning the pulse generator 152, first accelerometer 154, second accelerometer 156, and laser 158 as described above. The machine 110 is then operated in the normal manner to drive the main rotor 114 at its full, normal operating speed or any other speed lower or higher than the normal operating speed. Although no limitation is placed on the normal operating speed, as examples it may on the order of thousands, tens of thousands, or hundreds of thousands of revolutions per minute (rpm). The rotor balancing apparatus 100 is then operated to measure the imbalance in the main rotor 114. Specifically in the present example, the computing device 160 (e.g., the DSA 164) acquires the once-per-revolution pulse signal from the pulse generator 152 and measures the initial (or original) imbalance by acquiring the imbalance measurement signals from the first accelerometer 154 and second accelerometer 156. A trial imbalance is then created on balancing plane A, by operating the laser 158 to ablate material from the main rotor 114 at balancing plane A. The computing device 160 then acquires additional imbalance measurement signals from the first accelerometer 154 and second accelerometer 156 (corresponding to the effect of the trial imbalance created at plane A on the first accelerometer 154 and on the second accelerometer 156) as well as the once-per-revolution pulse signal from the pulse generator 152. After acquiring these data, the trial imbalance on plane A may be removed by removing the same amount of material at 180 degrees from where the original trial imbalance was created. Alternatively, the trial imbalance on plane A may remain, as long as it is accounted for in the subsequent calculations made in determining the adjustment to be made for reducing the imbalance, described below. Then, a trial imbalance is created on balancing plane B, by operating the laser 158 to ablate material from the main rotor 114 at balancing plane B. The computing device 160 then acquires additional imbalance measurement signals from the first accelerometer 154 and second accelerometer 156 (corresponding to the effect of the trial imbalance created at plane B on the first accelerometer 154 and on the second accelerometer 156) as well as the once-per-revolution pulse signal from the pulse generator 152.

Figure 2:
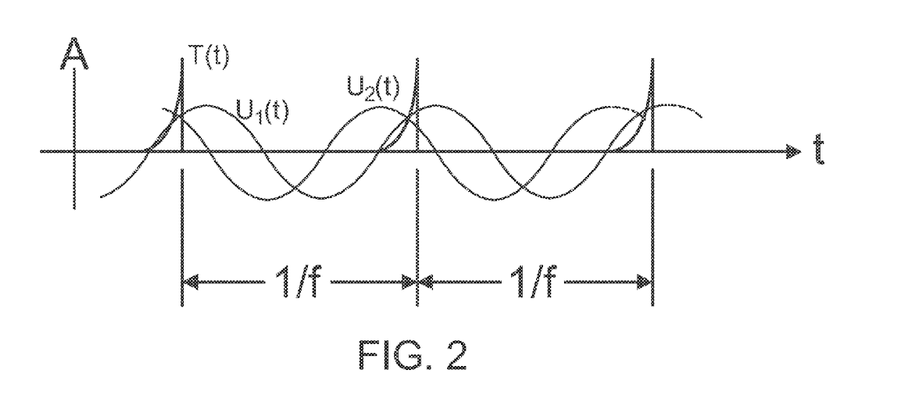
FIG. 2 is a plot of amplitudes A (arbitrary units) as a function of time (t) for the output of a pulse generator and measurements taken by accelerometers according to some embodiments.

FIG. 2 illustrates an example of imbalance measurement data that may be acquired. Specifically, FIG. 2 is a plot of amplitudes A (arbitrary units) as a function of time t (arbitrary units) for the output of the pulse generator 152 and the measurements taken by the first accelerometer 154 and second accelerometer 156. The pulse generator 152 outputs a pulse of amplitude T(t) once per every revolution of the shaft 122, the frequency f of which may be correlated to the angular speed of the shaft 122. The plots of amplitudes $U_1(t)$ and $U_1(t)$ correspond to the accelerations measured by the first accelerometer 154 and second accelerometer 156, respectively, resulting from the initial or original imbalance (before adding the trial imbalances) of the main rotor 114. The $U_1(t)$ and $U_1(t)$ response signals are sinusoidal due to the rotation of the main rotor 114. The amplitudes $T(t)$, $U_1(t)$ and $U_1(t)$ may be expressed in the frequency domain as follows:

$$T(f) = |T|e^{i\omega t},$$

$$U_1(f) = |U_1|e^{i(\omega t + \varphi_{U_1})}, \text{ and}$$

$$U_2(f) = |U_2|e^{i(\omega t + \varphi_{U_2})},$$

where $\omega$ is the angular speed of the shaft 122, $\varphi_{U1}$ is the phase of the amplitude $U_1$, and $\varphi_{U2}$ is the phase of the amplitude $U_2$. Similar plots of may be generated to show the sinusoidal responses of the first accelerometer 154 and second accelerometer 156 after creating the trial imbalance at plane A, $U_{1A}(t)$ and $U_{2A}(t)$, and after creating the trial imbalance at plane B, $U_{1B}(t)$ and $U_{2B}(t)$. These amplitudes may similarly be expressed in the frequency domain as follows:

$$U_{1A}(f) = |U_{1A}|e^{i(\omega t + \varphi_{U_{1A}})},$$

$$U_{2A}(f) = |U_{2A}|e^{i(\omega t + \varphi_{U_{2A}})},$$

$$U_{1B}(f) = |U_{1B}|e^{i(\omega t + \varphi_{U_{1B}})}, \text{ and}$$

$$U_{2B}(f) = |U_{2B}|e^{i(\omega t + \varphi_{U_{2B}})},$$

where $\varphi_{U}1A$, $\varphi_{U}2A$, $\varphi_{U}1B$, and $\varphi_{U}2B$ are the phases of the amplitudes $U_{1A}(t)$, $U_{2A}(t)$, $U_{1B}(t)$, and $U_{2B}(t)$, respectively.

The component $\varphi t$ may be removed from all measurement values by normalizing the values by $T(t)$. For example, normalizing the value for the amplitude $U_1(t)$ may be done as follows:

$$\frac{U1}{T} = \frac{|U_1|e^{i(\omega t + \varphi_{U1})}}{|T|e^{i\omega t}} = \frac{|U_1|e^{i\varphi_{U1}}}{|T|}.$$

Similar results obtain after normalizing the values for the other amplitudes, as follows:

$$\frac{U2}{T} = \frac{|U_2|e^{i\varphi_{U2}}}{|T|},$$

$$\frac{U1A}{T} = \frac{|U_{1A}|e^{i\varphi_{U1A}}}{|T|},$$

$$\frac{U2A}{T} = \frac{|U_{2A}|e^{i\varphi_{U2A}}}{|T|},$$

$$\frac{U1B}{T} = \frac{|U_{1B}|e^{i\varphi_{U1B}}}{|T|},$$

and $$\frac{U2B}{T} = \frac{|U_{2B}|e^{i\varphi_{U2B}}}{|T|}.$$

Depending on the algorithm employed, the component $|T|$ may be eliminated entirely in subsequent calculations.

After measuring the imbalance (i.e., acquiring all of the foregoing data), the computing device 160 utilizes these measurement data to calculate the adjustment to be made to the mass distribution of the main rotor 114. The calculated mass adjustment is one that will reduce (or counteract) the imbalance measured in the previous steps. This calculation may be done by performing an appropriate algorithm, as appreciated by persons skilled in the art. For example, the calculation may be based on the amplitude values set forth above, as well the relative axial distances of the two measurement planes where the amplitudes are measured (the planes in which the first accelerometer 154 and second accelerometer 156 are located) and the two balancing planes A and B in order to calculate the moments at the measurement planes. The location (radius, axial position, and angular position) of the mass adjustment to be made may be determined as the location where the mass adjustment brings the forces F and moments M at the two measurement planes into equilibrium, i.e., $\Sigma F=0$ and $\Sigma M=0$. In a typical embodiment, the computing device 160 is configured for performing the calculations automatically, while in other embodiments the calculations may be performed manually by a user.

The operating parameters of the laser 158 are then determined based on the calculated mass adjustment. The operating parameters may include the timing, duration, total number of pulses of the first laser beam 162 and second laser beam 164 to be applied to the main rotor 114 at the respective balancing planes A and B, as needed for properly adjusting the mass distribution of the main rotor 114 by material ablation and hence dynamically balancing the main rotor 114. The laser 158 is then operated to carry out the required material ablation in response to control signals transmitted from the computing device 160. If the laser 158 is configured for outputting two laser beams (the first laser beam 162 and second laser beam 164) as shown in FIG. 1, the proper imbalance adjustments may be made at planes A and B simultaneously. On the other hand, if only one laser beam is utilized, then after making the correction at plane A or B the laser beam is moved (e.g., via adjusting optics, moving the laser 158, etc.) to the other plane and fired to correct the imbalance at the other plane.

Subsequently, the imbalance in the main rotor 114 may be measured again and the entire procedure described above repeated in one or more additional iterations until the desired level of balancing (and hence the desired level of residual imbalance) of the main rotor 114 is achieved. It will be noted that the above-described process of imbalance correction is deterministic in principle if the rotating system is linear. Because in practice the system is non-linear (e.g., due to the shaft 122 not being infinitely stiff, due to cross measurement between the accelerometers 154 and 156, etc.), the process typically requires a few iterations to converge to the desired level of balancing.

An example of implementing the balancing methods disclosed herein will now be described in which the rotor to be balanced includes a set of rotating blades, as in the case of a turbomolecular pump or other type of pump. If the correction to the imbalance is to be done at the tip of the blades, and the tip of each blade has a width less than 1 millimeter (mm), then an ablation resolution of 0.1 mm may be considered reasonable. Assuming a full rotational speed of 60,000 rpm, or 1000 revolutions per second (rps), the rotational velocity is $2\pi \times 1000 = 6280$ radians per second (rad/s). If a microsecond laser pulse is utilized, the angle covered will be about 0.006 rad. Assuming further that the outer diameter of the rotor is 100 mm (and thus the radius is 50 mm or 0.05 m), the distance covered by a point on the circumference will be 0.0003 m or 300 micrometers (μm). In this situation, a repeatable ablation within 100 μm (0.1 mm) will require a triggering resolution of about 0.3 microseconds (μs) or 300 nanoseconds (ns) or better.

A commercially available nanosecond pulse laser may have an approximate removal rate of 0.001 mm³/s. At a rotational frequency of 100 Hz and a radius of 50 mm (0.05 m), the centrifugal force created by 0.001 mm³ of aluminum (density about 2700 kg/m³) will be about 5 Newtons (N) (per $F=m \times r \times \omega^2$). If the removal rates can be controlled to a millisecond range, residual forces on the order of 0.005 N may be achieved (a very low residual balance). For a pump weighing 25 kg this will lead to a residual acceleration at the stator of $a=f/m=(0.005 \text{ N})/(25 \text{ kg})=0.0002 \text{ m/s}^2$. It thus may be seen that by utilizing a nanosecond pulsed laser the imbalance correction achievable may encompass a very large dynamic range of four to five orders of magnitude, limited mainly by the floor noise and the nonlinearity of the system.

Figure 3:
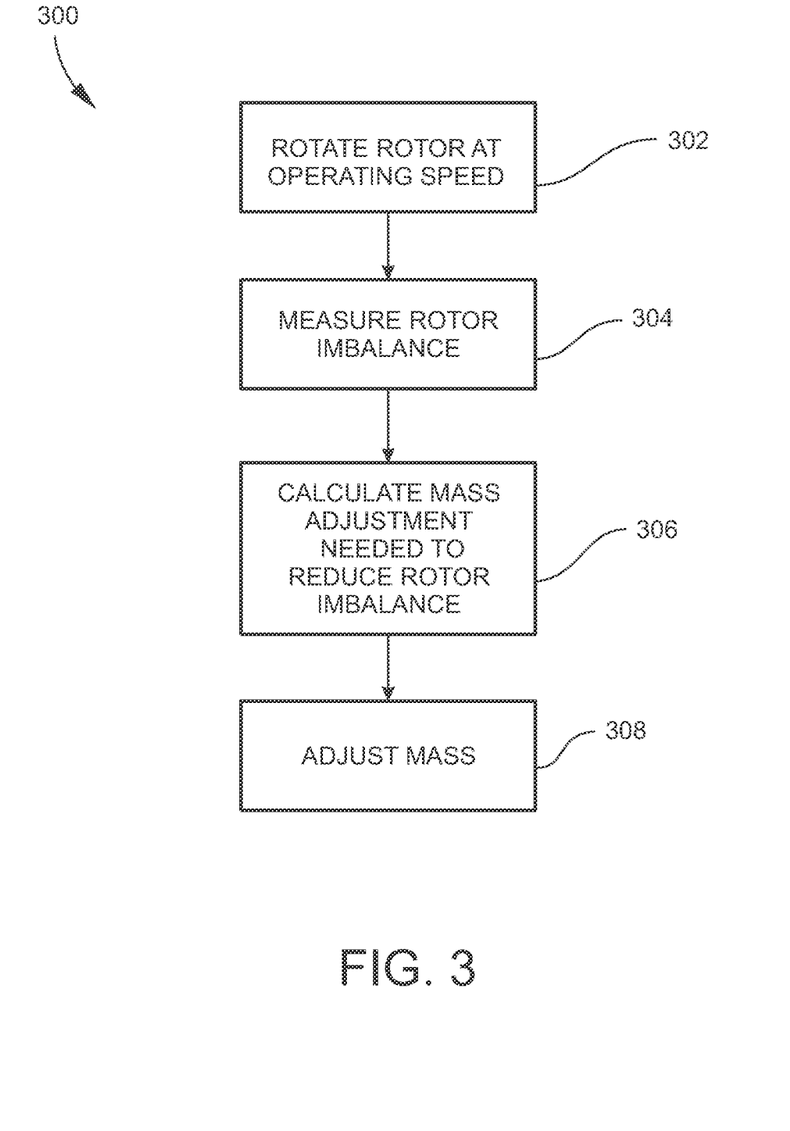
FIG. 3 is a flow diagram illustrating an example of a method for dynamically balancing a rotor according to some embodiments.

FIG. 3 is a flow diagram 300 illustrating a method for dynamically balancing a rotor according to some embodiments. The rotor is driven to rotate at an operating speed (step 302), which may be a normal operating speed of the rotor in its normal operating environment (e.g., a machine in which the rotor is installed and performs its intended function), or a rotational speed less or greater than the normal operating speed as described above. An imbalance in the rotor is measured (step 304). An adjustment to be made in a mass distribution of the rotor is then calculated, based on the measured imbalance (step 306). The calculation is made such that the adjustment will be effective to reduce the imbalance. The mass (or mass distribution) is then adjusted to reduce the imbalance, by operating a laser to ablate material from the rotor according to operating parameters based on the adjustment calculated (step 308). The foregoing steps of measuring, calculating, and adjusting may be performed while the rotor is rotating at the operating speed, and while installed or assembled in its normal operating environment.

As evident from the foregoing description, embodiments disclosed herein may eliminate the need to stop rotating equipment such as a rotor in order to perform the mass adjustment required for balancing the rotor. Once the system has attained a desired rotational speed and the data relating to imbalance is acquired, the data may be manipulated so as to produce the information required for triggering a fast pulsed laser at a specific time and duration. In this manner, the necessary amount of mass adjustment may be achieved at the precise location. The process may be repeated one or more times as needed to achieve the desired level of balance in the system. Because there is no need to stop and restart the rotating mass, it is possible to perform the balancing process disclosed herein, and to perform re-iterations of the balancing process if needed, very quickly.

Moreover, embodiments disclosed herein may enable balancing to be performed not only at the full, normal operating speeds of the system (or at any other desired speed) but also while the system is fully assembled in its normal configuration. Thus, the rotor to be balanced does not need to be disassembled from the system but rather may be balanced while continuing to be installed in the system and operating in the normal manner, and balancing does not require any modification or change to the system. This is particularly notable in the case of a system in which the rotating shaft is flexible, and further in which the rotor is cantilevered from the supporting bearings, as in the example described above and illustrated in FIG. 1. In such a case, failure to balance the system at full operational speed and while fully assembled limits the level of balancing that can be achieved, because the forces caused by the imbalance are proportional to the square of the rotational (angular) speed, and the imbalance forces increase with rotational speed since the displacement of the center of mass increases as the shaft flexes. Thus, embodiments disclosed herein may offer not only a reduction in the time required for balancing but also a higher, more precise level of balancing.

Exemplary Embodiments

Exemplary embodiments provided in accordance with the presently disclosed subject matter include, but are not limited to, the following:

1. A method for dynamically balancing a rotor, the method comprising: rotating the rotor about an axis; measuring an imbalance in the rotor; calculating an adjustment to be made to a mass distribution of the rotor based on the measured imbalance; and adjusting the mass distribution to reduce the imbalance, by operating a laser to ablate material from the rotor according to operating parameters based on the adjustment calculated, wherein the measuring, calculating, and adjusting are performed while the rotor is rotating.

2. The method of embodiment 1, wherein the measuring, calculating, and adjusting are performed while the rotor is installed in a machine comprising a shaft and a plurality of bearings supporting the shaft for rotation about the axis, and wherein the rotor is attached to and rotates with the shaft.

3. The method of embodiment 2, comprising rotating the rotor at an operating speed wherein the operating speed is a normal operating speed of the machine, a speed lower than the normal operating speed of the machine, or a speed higher the normal operating speed of the machine.

4. The method of embodiment 2 or 3, wherein the machine has a configuration selected from the group consisting of a pump, a turbine, a propeller, an impeller, a gear, a drum, a flywheel, and an engine.

5. The method of any of embodiments 2 to 4, comprising transporting a rotor balancing apparatus to the machine, and operating the rotor balancing apparatus to perform the steps of measuring, calculating, and adjusting.

6. The method of any of embodiments 2 to 4, comprising transporting the rotor to the machine before rotating the rotor.

7. The method of any of the preceding embodiments, comprising repeating the steps of measuring, calculating, and adjusting one or more times to further reduce the imbalance.

8. The method of any of the preceding embodiments, wherein the rotor rotates with a shaft about the axis and the shaft is supported by at least a first bearing and a second bearing, and wherein measuring the imbalance comprises measuring a radial acceleration in a first plane of the first bearing and measuring a radial acceleration in a second plane of the second bearing relative to the axis.

9. The method of embodiment 8, wherein measuring the radial acceleration of the first bearing and measuring the radial acceleration of the second bearing are done simultaneously or sequentially.

10. The method of embodiment 8 or 9, wherein measuring the radial acceleration of the first bearing comprises operating a first accelerometer mounted to the first bearing or to a stator to which the first bearing is attached, and measuring the radial acceleration of the second bearing comprises operating a second accelerometer mounted to the second bearing or to a stator to which the second bearing is attached.

11. The method of embodiment 10, wherein the first accelerometer and the second accelerometer are the same accelerometer, and measuring the radial acceleration of the second bearing comprises moving the accelerometer from the first bearing or from a location on the stator coplanar with the first bearing, to the second bearing or to a location on the stator coplanar with the second bearing.

12. The method of any of the preceding embodiments, wherein measuring the imbalance comprises measuring an initial imbalance, followed by measuring a first trial imbalance located at a first plane of the rotor and a second trial imbalance located at a second plane of the rotor at an axial distance from the first plane.

13. The method of embodiment 12, comprising creating the first trial imbalance before measuring the first trial imbalance, and after measuring the first trial imbalance, creating the second trial imbalance.

14. The method of embodiment 13, wherein creating the first trial imbalance and creating the second trial imbalance comprises operating the laser to ablate material at the first plane and at the second plane.

15. The method of embodiment 13 or 14, comprising, after measuring the first trial imbalance, removing the first trial imbalance before creating the second trial imbalance.

16. The method of embodiment 15, wherein removing the first trial imbalance comprises operating the laser to ablate material from the rotor.

17. The method of any of embodiments 12 to 16, wherein calculating the adjustment to be made to the mass distribution of the rotor comprises calculating an adjustment to be made to the mass distribution at the first plane and an adjustment to be made in the mass distribution at the second plane.

18. The method of any of embodiments 12 to 17, wherein adjusting the mass distribution comprises operating the laser to ablate material from the first plane and the second plane.

19. The method of any of embodiments 12 to 18, wherein adjusting the mass distribution comprises adjusting the mass distribution at the first plane and the second plane simultaneously or sequentially.

20. The method of any of the preceding embodiments, wherein the rotor rotates with a shaft, and further comprising generating a plurality of once-per-revolution pulses, each pulse corresponding to one revolution of the shaft, and normalizing the measured imbalance based on the pulses.

21. An apparatus for dynamically balancing a rotor, the apparatus comprising: an accelerometer configured for measuring an imbalance in the rotor while the rotor is rotating by measuring radial acceleration at the mounting location, and configured for outputting a measurement signal indicative of measured radial acceleration; a laser configured for ablating material from the rotor while the rotor is rotating; and a computing device configured for: receiving the measurement signal from the accelerometer; calculating an adjustment to be made to a mass distribution of the rotor based on the measured signal; and adjusting the mass distribution to reduce the imbalance, by controlling the laser to ablate material from the rotor while the rotor is rotating, according to operating parameters based on the adjustment calculated.

22. The apparatus of embodiment 21, wherein the apparatus is portable.

23. The apparatus of embodiment 21 or 22, comprising a machine configured for rotating the rotor, wherein the accelerometer is configured for being mounted at the machine, and the laser is configured for being mounted relative to the machine so as to be optically aligned with one or more selected balancing planes of the rotor.

24. The apparatus of any of embodiments 21 to 23, wherein the accelerometer comprises a first accelerometer configured for being mounted at a first mounting location, and a second accelerometer configured for being mounted at a second mounting location.

25. The apparatus of any of embodiments 21 to 24, wherein the computing device is configured for calculating the adjustment based on measurement signals corresponding to measurement of an initial imbalance, a first trial imbalance located at a first plane of the rotor, and a second trial imbalance located at a second plane of the rotor at an axial distance from the first plane.

26. The apparatus of embodiment 25, wherein the computing device is configured for controlling the laser to create the first trial imbalance by ablating material from the rotor at the first plane, and to create the second trial imbalance by ablating material from the rotor at the second plane.

27. The apparatus of any of embodiments 21 to 26, comprising a once-per-revolution pulse generator configured for generating a pulse once per every revolution of a shaft with which the rotor rotates, wherein the computing device is configured for calculating the adjustment based on pulses received from the once-per-revolution pulse generator.

It will be understood that a computing device, such as the computing device 160 described above and schematically illustrated in FIG. 1, may include a processor (typically electronics-based), which may be representative of a main electronic processor providing overall control, and one or more electronic processors configured for dedicated control operations or specific signal processing tasks (e.g., a graphics processing unit, or GPU). The computing device 160 may also include one or more memories (volatile and/or non-volatile) for storing data and/or software. The computing device 160 may also include one or more device drivers for controlling one or more types of user interface devices and providing an interface between the user interface devices and components of the computing device 160 communicating with the user interface devices. Such user interface devices may include user input devices (e.g., keyboard, keypad, touch screen, mouse, joystick, trackball, and the like) and user output devices (e.g., display screen, printer, visual indicators or alerts, audible indicators or alerts, and the like). In various embodiments, the computing device 160 may be considered as including one or more user input devices and/or user output devices, or at least as communicating with them. The computing device 160 may also include one or more types of computer programs or software contained in memory and/or on one or more types of computer-readable media. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the computing device 160, including interaction between hardware and application software. In particular, the operating system may provide a graphical user interface (GUI) displayable via a user output device such as a display screen, and with which a user may interact with the use of a user input device such as a keyboard or a pointing device (e.g., mouse). The computing device 160 may also include one or more data acquisition/signal conditioning components (as may be embodied in hardware, firmware and/or software), such as the DSA 164 (FIG. 1), for receiving and processing signals such as described above, as well as for formatting data for presentation in a textual or graphical format on a display device.

As used herein, an "interface" or "user interface" is generally a system by which users interact with a computing device. An interface may include an input (e.g., a user input device) for allowing users to manipulate a computing device, and may include an output (e.g., a user output device) for allowing the system to present information and/or data, indicate the effects of the user's manipulation, etc. An example of an interface on a computing device includes a graphical user interface (GUI) that allows users to interact with programs in more ways than typing. A GUI typically may offer display objects, and visual indicators, as opposed to (or in addition to) text-based interfaces, typed command labels or text navigation to represent information and actions available to a user. For example, an interface may be a display window or display object, which is selectable by a user of a computing device for interaction. The display object may be displayed on a display screen of a computing device and may be selected by and interacted with by a user using the interface. In one non-limiting example, the display of the computing device may be a touch screen, which may display the display icon. The user may depress the area of the touch screen at which the display icon is displayed for selecting the display icon. In another example, the user may use any other suitable interface of a computing device, such as a keypad, to select the display icon or display object. For example, the user may use a track ball or arrow keys for moving a cursor to highlight and select the display object.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the computing device 160 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the computing device 160 in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for balancing a rotor, the method comprising:
rotating the rotor about an axis of an assembled system in which the rotor is assembled in a normal configuration for an intended operation;
measuring an imbalance in the rotor by at least one accelerometer positioned on at least one plane of the rotor of the assembled system;
mathematically calculating an adjustment to be made to a mass distribution of the rotor based on the measured imbalance such that, in the calculated adjustment, forces and moments of the mass distribution at the at least one plane become negligible; and
after the calculating, adjusting the mass distribution to reduce the imbalance, by operating a laser to ablate material from the rotor according to operating parameters based on the adjustment calculated,
wherein the measuring, calculating, and adjusting are performed while the rotor is rotating in the assembled system such that, after the balancing of the rotor is complete, the rotor is useable for the intended operation without disassembly from the assembled system.

2. The method of claim 1, wherein the measuring, calculating, and adjusting are performed while the rotor is installed in a machine comprising a shaft and a plurality of bearings supporting the shaft for rotation about the axis, and wherein the rotor is attached to and rotates with the shaft.

3. The method of claim 2, wherein the machine has a configuration selected from the group consisting of a pump, a turbine, a propeller, an impeller, a gear, a drum, a flywheel, and an engine.

4. The method of claim 2, comprising transporting a rotor balancing apparatus to the machine, and operating the rotor balancing apparatus to perform the measuring, calculating, and adjusting.

5. The method of claim 1, comprising repeating the measuring, calculating, and adjusting one or more times to further reduce the imbalance.

6. The method of claim 1, wherein the rotor rotates with a shaft about the axis and the shaft is supported by at least a first bearing and a second bearing, and wherein the measuring the imbalance comprises measuring a radial acceleration in a first plane of the first bearing and measuring a radial acceleration in a second plane of the second bearing relative to the axis.

7. The method of claim 6, wherein the measuring radial acceleration is selected from the group consisting of:
measuring the radial acceleration of the first bearing and measuring the radial acceleration of the second bearing are done simultaneously;
measuring the radial acceleration of the first bearing and measuring the radial acceleration of the second bearing are done sequentially;
measuring the radial acceleration of the first bearing comprises operating a first accelerometer mounted to the first bearing or to a stator to which the first bearing is attached, and measuring the radial acceleration of the second bearing comprises operating a second accelerometer mounted to the second bearing or to a stator to which the second bearing is attached;
measuring the radial acceleration of the first bearing comprises operating an accelerometer mounted to the first bearing or at a location on the stator coplanar with the first bearing, and measuring the radial acceleration of the second bearing comprises moving the accelerometer from the first bearing or from the location on the stator coplanar with the first bearing, to the second bearing or to a location on the stator coplanar with the second bearing;
a combination of two or more of the foregoing.

8. The method of claim 1, wherein the measuring the imbalance comprises measuring an initial imbalance, followed by measuring a first trial imbalance located at a first plane of the rotor and a second trial imbalance located at a second plane of the rotor at an axial distance from the first plane.

9. The method of claim 8, wherein the measuring the first trial imbalance and the measuring the second trial imbalance are selected from the group consisting of:
creating the first trial imbalance before measuring the first trial imbalance, and after measuring the first trial imbalance, creating the second trial imbalance;
creating the first trial imbalance and creating the second trial imbalance by operating the laser to ablate material at the first plane and at the second plane, respectively; and
both of the foregoing.

10. The method of claim 9, comprising, after measuring the first trial imbalance, removing the first trial imbalance before creating the second trial imbalance.

11. The method of claim 10, wherein the removing the first trial imbalance comprises operating the laser to ablate material from the rotor.

12. The method of claim 8, wherein the calculating the adjustment to be made to the mass distribution of the rotor comprises calculating an adjustment to be made to the mass distribution at the first plane and an adjustment to be made in the mass distribution at the second plane.

13. The method of claim 8, wherein the adjusting the mass distribution is selected from the group consisting of:
operating the laser to ablate material from the first plane and the second plane;
adjusting the mass distribution at the first plane and the second plane simultaneously;
adjusting the mass distribution at the first plane and the second plane sequentially; and
two or more of the foregoing.

14. The method of claim 1, wherein the rotor rotates with a shaft, and further comprising generating a plurality of once-per-revolution pulses, each pulse corresponding to one revolution of the shaft, and normalizing the measured imbalance based on the pulses.

15. An apparatus for balancing a rotor, the apparatus comprising:
an accelerometer configured for measuring an imbalance in the rotor while the rotor is rotating by measuring radial acceleration at a mounting location, and configured for outputting a measurement signal indicative of the measured radial acceleration;
said accelerometer disposed in an assembled system in which the rotor is assembled in a normal configuration for an intended operation;
a laser configured for ablating material from the rotor while the rotor is rotating; and
a computing device configured for:
receiving the measurement signal from the accelerometer;
mathematically calculating an adjustment to be made to a mass distribution of the rotor based on the measurement signal such that, in the calculated adjustment, forces and moments of the mass distribution at at least one plane of the mounting location become negligible; and
after the calculating, adjusting the mass distribution to reduce the imbalance, by controlling the laser to ablate material from the rotor while the rotor is rotating, according to operating parameters based on the adjustment calculated,
wherein, after the balancing of the rotor is complete, the rotor is useable for the intended operation without disassembly from the assembled system.

16. The apparatus of claim 15, comprising a machine configured for rotating the rotor, wherein the accelerometer is configured for being mounted at the machine, and the laser is configured for being mounted relative to the machine so as to be optically aligned with one or more selected balancing planes of the rotor.

17. The apparatus of claim 15, wherein the accelerometer comprises a first accelerometer configured for being mounted at a first mounting location, and a second accelerometer configured for being mounted at a second mounting location.

18. The apparatus of claim 15, wherein the computing device is configured for calculating the adjustment based on measurement signals corresponding to measurement of an initial imbalance, a first trial imbalance located at a first plane of the rotor, and a second trial imbalance located at a second plane of the rotor at an axial distance from the first plane.

19. The apparatus of claim 18, wherein the computing device is configured for controlling the laser to create the first trial imbalance by ablating material from the rotor at the first plane, and to create the second trial imbalance by ablating material from the rotor at the second plane.

20. The apparatus of claim 15, comprising a once-per-revolution pulse generator configured for generating a pulse once per every revolution of a shaft with which the rotor rotates, wherein the computing device is configured for calculating the adjustment based on pulses received from the once-per-revolution pulse generator.

\* \* \* \* \*

UNITED STATES PATENT AND TRADEMARK OFFICE
CERTIFICATE OF CORRECTION

PATENT NO. : 10,145,753 B2
APPLICATION NO. : 14/856028
DATED : December 4, 2018
INVENTOR(S) : Gershon Perelman et al.

It is certified that error appears in the above-identified patent and that said Letters Patent is hereby corrected as shown below:

In the Specification

In Column 9, Line 30, delete "$\Phi_U 1A, \Phi_U 2A, \Phi_U 1B,$ and $\Phi_U 2B$" and insert -- $\Phi U1A, \Phi U2A, \Phi U1B,$ and $\Phi U2B$ --, therefor.

In Column 9, Line 33, delete "$\Phi t$" and insert -- $\omega t$ --, therefor.

Signed and Sealed this
Thirtieth Day of July, 2019

Andrei Iancu
*Director of the United States Patent and Trademark Office*